Jan. 21, 1947.  F. J. JOHNS ET AL  2,414,532
ELECTRICAL MACHINE
Filed June 9, 1944  2 Sheets-Sheet 1

WITNESSES:
C. J. Weller.
F. P. Lyle

INVENTORS
Francis J. Johns and
Theodore C. Fockler.
BY O. B. Buchanan
ATTORNEY

Jan. 21, 1947.   F. J. JOHNS ET AL   2,414,532
ELECTRICAL MACHINE
Filed June 9, 1944   2 Sheets-Sheet 2

WITNESSES:

INVENTORS
Francis J. Johns and
Theodore C. Fockler.
BY
ATTORNEY

Patented Jan. 21, 1947

2,414,532

UNITED STATES PATENT OFFICE 2,414,532

ELECTRICAL MACHINE

Francis J. Johns and Theodore C. Fockler, Pittsburgh, Pa., assignors to Westinghouse Electric Corporation, East Pittsburgh, Pa., a corporation of Pennsylvania Application June 9, 1944, Serial No. 539,482

13 Claims. (Cl. 171—123)

The present invention relates to the construction of dynamoelectric machines, and more particularly to an enclosed motor-generator set which is adapted for cooling by circulation of water through passages in the frame.

The construction of the present invention is especially adapted for motor-generator sets consisting of an electric motor driving a high-frequency alternator, usually of the inductor type, for supplying high-frequency alternating current. Such sets are used for supplying induction heating equipment, or other devices requiring high-frequency current. The construction disclosed is especially adapted for motor-generator sets of this type, but it will be obvious that its usefulness is not necessarily restricted to this specific application, and that it can also be used for other types of dynamoelectric machines.

High-frequency motor-generator sets, such as those used for supplying induction heating equipment, have usually been of open, air-cooled construction, but such sets are often used in relatively dirty locations, and considerable trouble has been experienced from clogging of the air passages by dirt carried into the machine by the cooling air, with resultant overheating of the machine. The use of filters to remove dirt from the air before it enters the machine is not entirely satisfactory because such filters require frequent cleaning, and if such cleaning is neglected, as it often is, they prevent adequate flow of air into the machine, which also results in overheating. Thus, the existing types of high-frequency motor-generator sets have been subject to considerable difficulty because of inadequate ventilation, as a result of the conditions under which they are used, although good ventilation is especially necessary in this type of machine because the high-frequency currents produce a relatively large amount of heat to be dissipated. Another objection to the previously used open type of machine is the excessive amount of noise produced, since these machines usually operate at relatively high speed.

The principal object of the present invention is to provide an enclosed dynamoelectric machine which is effectively cooled by circulation of water through passages in the frame and by circulation of the internal air in good heat-exchange relation to the cooling water.

Another object of the invention is to provide a water-cooled dynamoelectric machine in which large, straight passages are provided for the circulation of water, so as to facilitate cleaning the water passages, and to prevent any substantial deposits of scale or sludge from the water.

A further object of the invention is to provide an enclosed, water-cooled dynamoelectric machine which has means for providing access to the interior of the machine for inspection without requiring the removal of an end bracket or draining of the water from the machine.

A more specific object of the invention is to provide a high-frequency motor-generator set which is cooled by circulation of water through straight passages in the frame, and in which the air enclosed in the generator end of the machine and the air enclosed in the motor end of the machine are separately circulated through air chambers in the frame in good heat-exchange relation to the water flowing through the water passages.

The invention will be more fully understood from the following detailed description, taken in connection with the accompanying drawings, in which.

Figure 4:
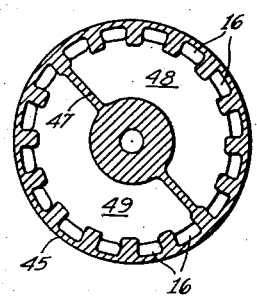
Figs. 4 and 5 are somewhat diagrammatic transverse sectional views through the end brackets of the machine of Fig. 3, on the lines IV—IV and V—V, respectively.
Figure 5:
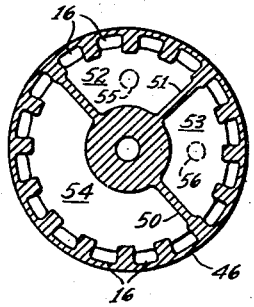
Figure 6:
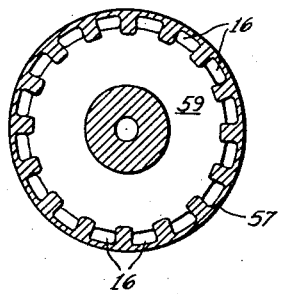
Figure 7:
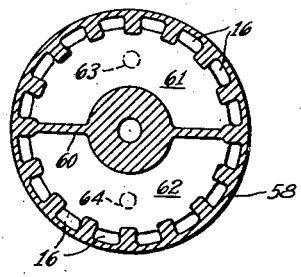
Figure 8:
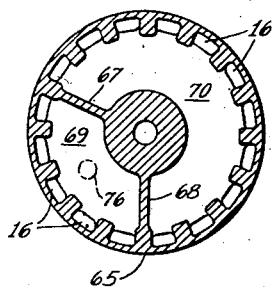
Figure 9:
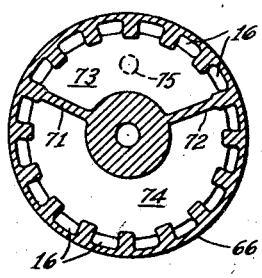

Figs. 6 and 7 are sectional views corresponding to Figs. 4 and 5, respectively, and showing opposite end brackets embodying another modification of the invention; and Figs. 8 and 9 are sectional views corresponding to Figs. 4 and 5, respectively, and showing a further modification of the invention.

The invention is shown in the drawings as embodied in a high-frequency motor-generator set consisting of a motor 1 driving a generator 2, the motor and generator being supported in a common frame structure 3. The motor 1 is shown in the drawings as a squirrel-cake induction motor of more or less usual construction, although it will be understood that any suitable type of electric motor might be used. The motor 1, as shown, has a laminated stator core 4, which is supported in the frame 3 by means of a plurality of longitudinal ribs 5 secured to the inner periphery of the frame 3 and spaced apart to permit the flow of air between the stator core 4 and the frame 3. The core 4 has slots in its inner surface in which primary windings 6 of any suitable type are placed. The motor 1 also has a laminated rotor core 7 secured to the shaft 8. The rotor core 7 has a plurality of ventilating passages 9 extending axially through it, and has a squirrel-cage secondary winding 10 placed in slots in its periphery.

The generator 2 is shown as a high-frequency alternating-current generator of the inductor type, and includes a laminated stator core 11 supported by a press fit in the frame structure 3. The core 11 has a plurality of axial ventilating passages 12 extending through it, and it has suitable armature windings and exciting windings, generally designated at 13, placed in slots in its inner periphery. The rotor 14 of the generator is of the usual laminated construction with a plurality of axial ventilating passages 15 extending through it, and is secured to the shaft 8 in any suitable manner. The rotor 14 has no windings but has teeth on its periphery to vary the reluctance of the magnetic path through the armature windings as the rotor rotates, so as to generate a high-frequency alternating voltage in the usual manner.

The frame structure 3 is generally cylindrical, as shown, with relatively thick walls, and a plurality of straight axial passages 16 are provided in the walls of the frame structure 3 for the circulation of cooling water. These passages are spaced apart circumferentially around the frame structure, as clearly shown in Fig. 2, and are open at the ends, but do not communicate with the interior of the frame structure. Openings 17 may be provided in the uppermost passages 16 to permit the escape of air when the machine is initially filled with water, these openings being closed by plugs 18 during normal operation.

A plurality of axial air chambers 19 is provided in the generator end of the frame 3 in the spaces between the water passages 16. These air chambers 19 are open to the interior of the frame structure at either end, but have no communication with the outside of the frame. Similar air chambers 20 are provided at the motor end of the machine, axially aligned with the chambers 19 but not connected with them, and the chambers 20 similarly communicate at each end with the interior of the frame. It will be apparent, therefore, that when the air within the frame structure 3 is circulated through the air chambers 19 or 20, it flows in good heat-exchange relation with water flowing through the passages 16, and if desired the effectiveness of heat transfer between the air and the water can be increased by the provision of longitudinal ribs on the interior surfaces of some or all of the air chambers, as indicated at 21, to increase the surface over which the air flows.

The ends of the frame structure 3 are closed by end brackets 22 and 23, in which are mounted bearings 24 of any suitable type for supporting the shaft 8. The end brackets 22 and 23 completely close the ends of the frame structure 3 and are secured to the frame by means of bolts 25, gaskets 26 being placed between the end brackets and the frame to prevent leakage of water. The bearings 24 have been shown as ball bearings mounted on the inside of the brackets, but it will be obvious that any suitable type of bearing might be used, and that the bearings could be mounted on the outside of the brackets, if desired, to permit removal and replacement of the bearings without having to drain the water from the machine and remove the end brackets.

The ends of the shaft are preferably covered by caps 27 so that the machine is completely enclosed.

Figure 2:
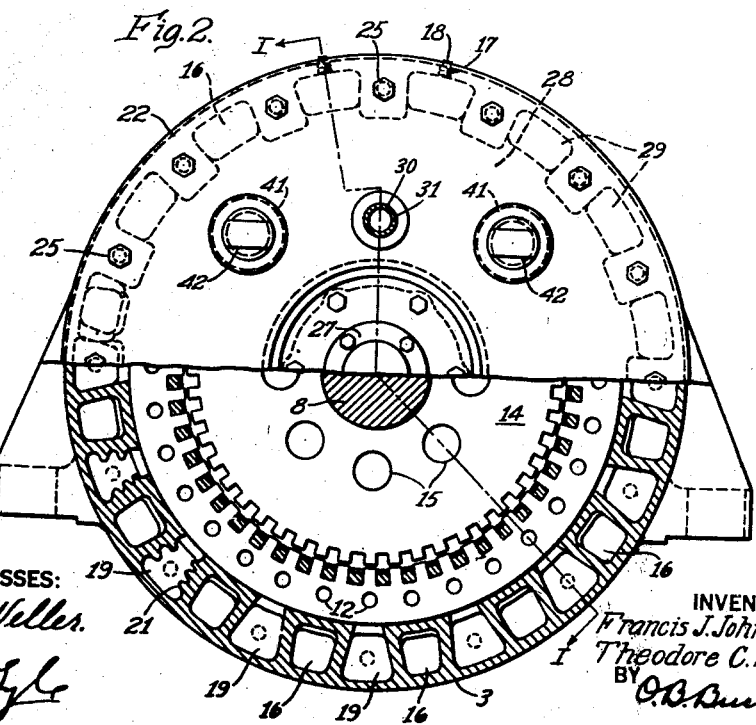
Fig. 2 is an end elevation, partially in section, on the line II—II of Fig. 1.

Each of the end brackets 22 and 23 has an annular chamber 28 formed in it which, as indicated in Fig. 2, extends completely around the end bracket. At the outer periphery of the annular chamber 28 in each end bracket there is a plurality of recesses 29, corresponding in number and position with the passages 16 in the frame 3, and having openings in the inside surface of the bracket, and the end brackets are assembled on the frame 3 with the openings in the recesses 29 coinciding with the ends of the passages 16, so that the annular chambers 28 function as headers to distribute the water supplied to them equally to all the passages 16. An inlet opening 30 is provided in the end bracket 22 at the generator end for reception of an inlet pipe 31 for supplying water to the machine, and a similar opening 32 is provided in the bracket 23 at the motor end of the machine for reception of a discharge pipe 33. The water is preferably circulated from the generator end to the motor end, as indicated above, since there is a greater amount of heat to be dissipated from the generator than from the motor, although in some cases it might be equally satisfactory to circulate the water in the opposite direction, and this is within the scope of the invention.

As previously stated, the air inside the frame structure 3 is circulated through the air chambers 19 and 20 so as to be cooled by the water flowing through the passages 16. This circulation of the internal air is effected by means of fans. The fan structure consists of a metal shroud ring 34 mounted on the shaft 8 between the motor and generator and carrying a set of fan blades 35 on the generator side and a second set of blades 36 on the motor side. The air discharged from the fan blades 35 and 36 is guided into the air chambers 19 and 20 by means of a stationary guide vane structure consisting of sheet metal support rings 37 secured to the interior of the frame 3 in any suitable way, as by bolts 38, and carrying a series of fixed guide vanes 39 co-operating with the fan blade 35, and a series of fixed guide vanes 40 co-operating with the fan blades 36. It will be apparent that this construction more or less completely separates the generator end of the machine from the motor end, and that the two sets of fan blades and co-operating guide vanes circulate the air in the two ends of the machine separately through the respective sets of air chambers 19 and 20, the paths of the air flow being generally indicated by the arrows in Fig. 1.

Inductor generators such as the generator 2 are usually designed with very short air gaps, and for this reason it is necessary to make relatively frequent inspections of the air gap to determine if there is any substantial eccentricity, such as may be caused by bearing wear, for example. In order to facilitate such inspection, the end bracket 22 is designed to permit access to the interior of the frame 3 without necessitating draining the water from the machine, or removal of the end bracket. For this purpose openings are provided through the end bracket, preferably at a plurality of points. These openings are formed by tubular walls 41, which are preferably cast integrally with the end bracket, and which extend through the annular chamber 28 as clearly shown in Fig. 1. Thus, the tubular walls 41 provide pipe-like openings through the end bracket to the interior of the frame structure, and these openings are radially aligned with the air gap of the generator 2. In normal operation, the openings 41 are closed by suitable plugs 42, but when it is desired to inspect the generator, the plugs 42 are removed, and the air gap can then be inspected, both visually and by insertion of a feeler gauge to check the air gap. The openings 41 have been shown only in the end bracket 22, but it will be apparent that if necessary or desired similar openings could also be provided in the end bracket 23.

In the operation of the motor-generator set described herein, water is supplied to the machine through the inlet pipe 31, from which it flows into the annular chamber 28 of the end bracket 22, which serves as a header to distribute the water equally to all of the passages 16. The water flows through these passages and into the annular chamber 28 of the end bracket 23, from which it is discharged through the discharge pipe 33. When the machine is running, the fan blades 35 circulate the air in the generator end of the machine through the air chambers 19, into which it is guided by the fixed vanes 39, and from which it flows, as shown by the arrows in Fig. 1, through the ventilating passages and air gap of the generator 2 back to the fan. Similarly, the fan blades 36 circulate the air in the motor end of the set through the air chambers 20, the fixed vanes 40 directing the air into these chambers, and the air flows from the chambers 20 back into the interior of the frame and through the ventilating passages and air gap of the motor 1, as shown by the arrows. Since the air is thus circulated through the chambers 19 and 20 in close heat-exchange relation with the water flowing in the passages 16, very effective cooling is obtained.

Figure 1:
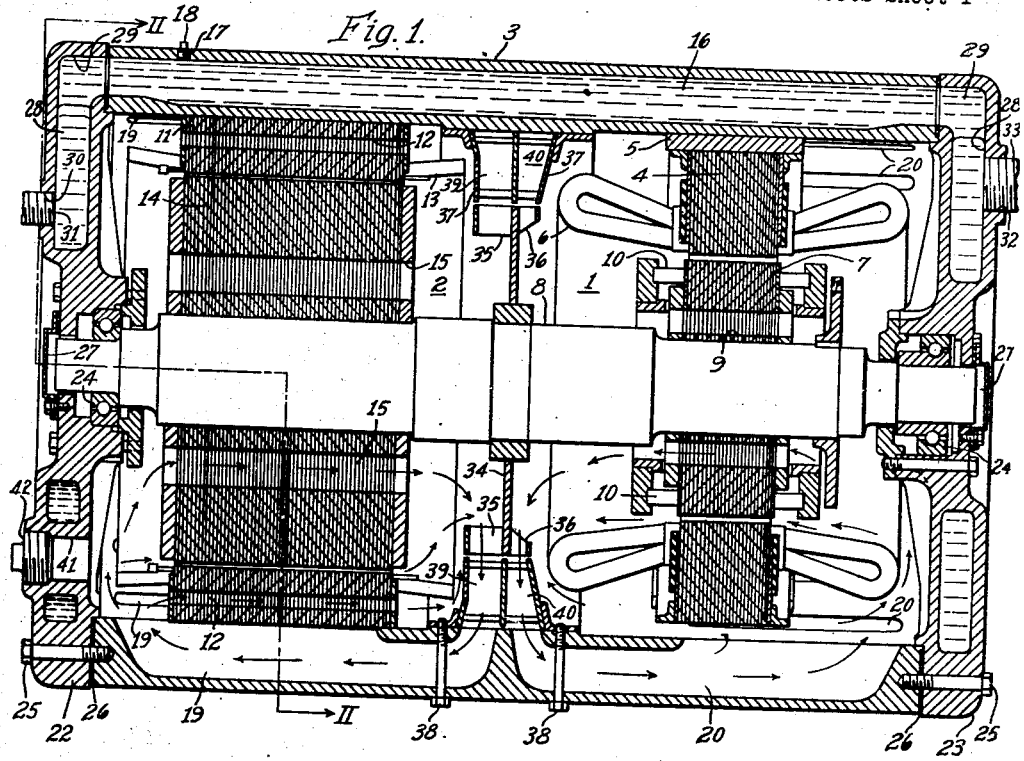
Figure 1 is a longitudinal sectional view of a motor-generator set embodying the invention, approximately on the line I—I of Fig. 2.

In the embodiment of the invention shown in Figs. 1 and 2 and described above, the water enters at one end of the machine, flows through all the passages 16 in parallel, and is discharged from the other end. Since the passages 16 are of large cross-section, a relatively large volume of water is required, and in some cases, such as where the available water supply is limited, it is desirable to use a smaller volume of water flowing at a higher velocity to obtain the same cooling effect. This may be done by providing walls or baffles in the annular chambers of the end brackets to cause the water to flow back and forth through the machine through two or more groups of water passages in series. Figs. 3 to 9 show several arrangements of such baffles for causing the water to flow in this way.

Figure 3:
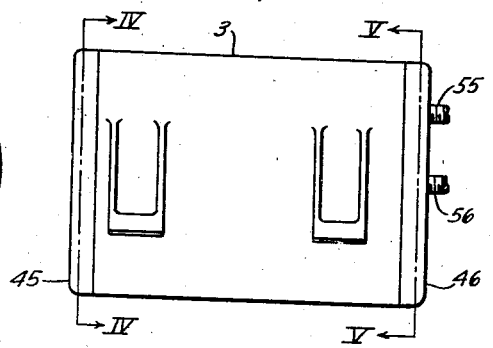
Fig. 3 is a side elevation of a machine embodying a modified form of the invention.

Fig. 3 shows a machine having a frame 3, which may be identical with the frame structure previously described, and having end brackets 45 and 46. The construction of the frame 3 and of the generator and motor supported in it are preferably the same as described in connection with Figs. 1 and 2, and the frame has water passages 16 extending through it and air chambers between the water passages as previously described. The end brackets 45 and 46 have been shown somewhat diagrammatically, but it will be understood that their actual construction is preferably similar to that of the brackets 22 and 23, including, if desired, the tubular walls 41 through the brackets, which have been omitted in Figs. 4 to 9 for the sake of simplicity. The end bracket 45 has a wall or baffle 47 extending diametrically across it so that the annular chamber in the bracket is divided into two chambers 48 and 49. The bracket 46 is similarly divided by a baffle 50 disposed at an angle of 90° to the baffle 47, when the brackets are assembled on the frame 3, and another baffle 51 extends at right angles to the baffle 50 on one side only of the baffle 50, so that the annular chamber of the bracket 46 is divided into three chambers 52, 53 and 54.

In operation, water enters the chamber 52 in the end bracket 46 through an inlet opening 55, the position of which is indicated diagrammatically in Fig. 5. The water flows from the chamber 52 through the group of passages 16 in the frame 3 which opens into the chamber 52, shown as the four passages at the top of the frame, and is discharged into the chamber 48 in the end bracket 45. The chamber 48 also extends over another group of passages 16 at one side of the frame and the water flows back through these passages into the chamber 54. The chamber 54 also extends over a third group of water passages, at the bottom of the frame, and the water entering the chamber 54 flows into these passages and through the frame into the chamber 49 in the end bracket 45. From the chamber 49 the water flows into a fourth group of passages 16 at the other side of the frame and back to the chamber 53 in the end bracket 46, from which it is discharged through the outlet opening 56. Thus, the water flows back and forth through the frame 3 through four successive groups of water passages in series, and is finally discharged at the same end of the machine at which it entered.

Figs. 6 and 7 show another modification embodied in end brackets 57 and 58, respectively, for opposite ends of the machine. The end bracket 57 may be similar to the brackets 22 and 23, having an annular chamber 59 extending uninterruptedly around it. The end bracket 58 has a wall or baffle 60 dividing its annular chamber into two equal chambers 61 and 62. In a machine having end brackets of this construction, water enters the chamber 61 through the inlet 63 and flows through the passages over which the chamber 61 extends to the other end of the machine and into the chamber 59 of the bracket 57. Since the chamber 59 extends entirely around the frame, water entering it through the upper group of passages 16 flows into the lower group of passages and flows back to the chamber 62 of the bracket 58, from which it is discharged through the discharge opening 64. Thus, in this modification, the cooling water flows from one end of the machine to the other through half of the water passages in the frame and flows back through the other half of the water passages.

A further modification is shown in Figs. 8 and 9 which show end brackets 65 and 66, respectively, adapted to be disposed at opposite ends of the frame 3. The annular chamber of the bracket 65 is divided by baffles 67 and 68 into two chambers 69 and 70, the chamber 69 extending over approximately one-third of the passages 16 and the chamber 70 extending over the other two-thirds of the passages. The bracket 66 is similarly divided by baffles 71 and 72 into two unequal chambers 73 and 74 extending over approximately one-third and two-thirds of the passages 16, respectively, and disposed as shown so that the baffle 72 coincides in angular position with the baffle 67 when the brackets are assembled on the frame 3. With this arrangement, water enters the chamber 73 through the inlet 75 and flows through the passages 16 to the chamber 70 in the bracket 65. Since the chamber 70 extends over a second group of passages 16, the water flows back through this second group of passages into the chamber 74, and from the chamber 74 through the third group of passages to the chamber 69, from which it is discharged through the discharge outlet 76. Thus, the water flows through the frame through three successive groups of passages in series.

It will be obvious from the examples given in Figs. 3 through 9 that various arrangements of baffles can be used in the end brackets to cause the water to flow through the machine in any desired path, ranging from all water passages in parallel to any number of groups of passages, or even all passages, in series. Thus, by suitable arrangement of baffles, a relatively small volume of water flowing at high velocity can be satisfactorily used for cooling, the required volume of water decreasing, and the velocity of the water increasing, as the number of parallel paths through the machine is reduced.

It should now be apparent that a very desirable construction for water-cooled motor-generator sets has been provided. This construction is especially suitable for high-frequency generators, which require very effective cooling because of the relatively large amount of heat to be dissipated. The arrangement of the air chambers in the spaces between the water passages, by which good heat-exchange relation between the air and the water is assured, provides the required effective cooling, which could not readily be obtained in other ways, such as by merely providing a water jacket on the machine, for example. The arrangement of the annular chambers in the end brackets and the water passages 16 is such that there are no pockets or other places where scale or sludge could be deposited from the water and accumulate, so that the water passages require only infrequent cleaning, and when such cleaning is necessary, it is greatly facilitated because the passages are straight and large, and can readily be cleaned after removal of the end brackets. The provision of the openings 41 in the end bracket at the generator end is also an important feature of the invention, since it makes possible the necessary inspection of the generator 2 without making it necessary to remove the end bracket or to drain the water from it. Since the machine is totally enclosed, the noise which was an objectionable feature of open high-frequency motor-generator sets is substantially eliminated.

A specific embodiment of the invention has been shown and described for the purpose of illustration, but it is to be understood that various other modifications and embodiments are possible. Thus, the construction could be applied to a single machine as well as to a motor-generator set, and other cooling media than water and air might be used if desired. It is to be understood, therefore, that although the invention has been specifically described, the invention is not limited to the particular details of construction shown, but in its broadest aspects it includes all equivalent, modifications and embodiments which come within the scope of the appended claims.

We claim as our invention:

1. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with all of said passages, inlet and discharge openings in said brackets for the circulation of a liquid cooling medium through said chambers and passages, means for circulating the air in the generator portion of the frame structure in heat-exchange relation to said cooling medium, and means for circulating the air in the motor portion of the frame structure in heat-exchange relation to the cooling medium.

2. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with all of said passages, inlet and discharge openings in said brackets for the circulation of a liquid cooling medium through said chambers and passages, means extending through the chamber in at least one of said end brackets for permitting access to the interior of the frame structure, means for circulating the air in the generator portion of the frame structure in heat-exchange relation to said cooling medium, and means for circulating the air in the motor portion of the frame structure in heat-exchange relation to the cooling medium.

3. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with all of said passages, inlet and discharge openings in said brackets for the circulation of a liquid cooling medium through said chambers and passages, a plurality of longitudinal air chambers in the frame structure adjacent the generator, said air chambers communicating with the interior of the frame structure and being positioned between said axial passages, means for circulating the air in the generator portion of the frame structure through said air chambers, a plurality of longitudinal air chambers in the frame structure adjacent the motor, said last-mentioned air chambers communicating with the interior of the frame structure and being positioned between the axial passages, and means for circulating the air in the motor portion of the frame structure through the last-mentioned air chambers.

4. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with all of said passages, inlet and discharge openings in said brackets for the circulation of a liquid cooling medium through said chambers and passages, means extending through the chamber in at least one of said end brackets for permitting access to the interior of the frame structure, a plurality of longitudinal air chambers in the frame structure adjacent the generator, said air chambers communicating with the interior of the frame structure and being positioned between said axial passages, means for circulating the air in the generator portion of the frame structure through said air chambers, a plurality of longitudinal air chambers in the frame structure adjacent the motor, said last-mentioned air chambers communicating with the interior of the frame structure and being positioned between the axial passages, and means for circulating the air in the motor portion of the frame structure through the last-mentioned air chambers.

5. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with all of said passages, inlet and discharge openings in said brackets for the circulation of a liquid cooling medium through said chambers and passages, a plurality of tubular passages extending completely through at least one of the end brackets to permit access to the interior of the frame structure, a plurality of longitudinal air chambers in the frame structure adjacent the generator, said air chambers communicating with the interior of the frame structure and being positioned between said axial passages, means for circulating the air in the generator portion of the frame structure through said air chambers, a plurality of longitudinal air chambers in the frame structure adjacent the motor, said last-mentioned air chambers communicating with the interior of the frame structure and being positioned between the axial passages, and means for circulating the air in the motor portion of the frame structure through the last-mentioned air chambers.

6. A motor-generator set comprising an electric motor and an electric generator, a common frame structure for said motor and generator, said frame structure having a plurality of axial passages therethrough, end brackets completely closing the ends of the frame structure, each of said end brackets having a closed annular chamber therein communicating with said passages, said chambers and passages being adapted for the circulation of a liquid cooling medium, means in the annular chamber of at least one of the end brackets for causing the cooling medium to flow through at least two groups of axial passages in series, a plurality of longitudinal air chambers in the frame structure adjacent the generator, said air chambers communicating with the interior of the frame structure and being positioned between said axial passages, means for circulating the air in the generator portion of the frame structure through said air chambers, a plurality of longitudinal air chambers in the frame structure adjacent the motor, said last-mentioned air chambers communicating with the interior of the frame structure and being positioned between the axial passages, and means for circulating the air in the motor portion of the frame structure through the last-mentioned air chambers.

7. A motor-generator set comprising an electric motor and an electric generator, a common frame structure for said motor and generator, said frame structure having a plurality of axial passages therethrough, end brackets completely closing the ends of the frame structure, each of said end brackets having an annular chamber therein communicating with all of said passages, said chambers and passages being adapted for the circulation of a liquid cooling medium, baffles in the annular chamber of at least one of the end brackets, said baffles being disposed to direct the flow of the cooling medium to cause it to flow successively through at least two groups of axial passages in series, a plurality of longitudinal air chambers in the frame structure adjacent the generator, said air chambers communicating with the interior of the frame structure and being positioned between said axial passages, means for circulating the air in the generator portion of the frame structure through said air chambers, a plurality of longitudinal air chambers in the frame structure adjacent the motor, said last-mentioned air chambers communicating with the interior of the frame structure and being positioned between the axial passages, and means for circulating the air in the motor portion of the frame structure through the last-mentioned air chambers.

8. A dynamoelectric machine having a stator member and a rotor member, said stator member including a frame structure and end brackets completely closing the ends of the frame structure, said frame structure having a plurality of axial passages therethrough, each of said end brackets having a closed, annular chamber therein communicating with said axial passages, inlet and discharge means in said annular chambers for circulating a liquid cooling medium through the chambers and axial passages, and means for circulating air within the frame structure in heat-exchange relation with said cooling medium.

9. A dynamoelectric machine having a stator member and a rotor member, said stator member including a frame structure and end brackets completely closing the ends of the frame structure, said frame structure having a plurality of axial passages therethrough spaced apart circumferentially of the frame structure, said frame structure also having a plurality of axially extending air chambers therein in the spaces between said axial passages, said air chambers communicating only with the interior of the frame structure, each of said end brackets having a closed, annular chamber therein communicating with said axial passages, inlet and discharge means in said annular chambers for circulating a liquid cooling medium through the chambers and axial passages, and means for circulating air within the frame structure through said air chambers.

10. A dynamoelectric machine having a stator member and a rotor member, said stator member including a frame structure and end brackets completely closing the ends of the frame structure, said frame structure having a plurality of axial passages therethrough, each of said end brackets having a closed, annular chamber therein communicating with said axial passages, inlet and discharge means in said annular chambers for circulating a liquid cooling medium through the chambers and axial passages, a tubular passage extending axially entirely through the annular chamber in at least one of the end brackets, said tubular passage being open at both ends to permit access to the interior of the frame structure while the annular chamber is filled with liquid, removable means for closing one end of the tubular passage, and means for circulating air within the frame structure in heat-exchange relation with said cooling medium.

11. A dynamoelectric machine having a stator member and a rotor member, said stator member including a frame structure and end brackets completely closing the ends of the frame structure, said frame structure having a plurality of axial passages therethrough spaced apart circumferentially of the frame structure, said frame structure also having a plurality of axially extending air chambers therein in the spaces between said axial passages, said air chambers communicating only with the interior of the frame structure, each of said end brackets having a closed, annular chamber therein communicating with said axial passages, inlet and discharge means in said annular chambers for circulating a liquid cooling medium through the chambers and axial passages, a tubular passage extending axially entirely through the annular chamber in at least one of the end brackets, said tubular passage being open at both ends to permit access to the interior of the frame structure while the annular chamber is filled with liquid, removable means for closing one end of the tubular passage, and means for circulating air within the frame structure through said air chambers.

12. A dynamoelectric machine having a stator member and a rotor member, said stator member including a frame structure and end brackets completely closing the ends of the frame structure, said frame structure having a plurality of axial passages therethrough, each of said end brackets having a closed, annular chamber therein communicating with said axial passages, inlet and discharge means in said annular chambers for circulating a liquid cooling medium through the chambers and axial passages, means in at least one of said annular chambers for directing the flow of liquid to cause it to flow through successive groups of axial passages in series, and means for circulating air within the frame structure in heat-exchange relation with said cooling medium.

13. A dynamoelectric machine having a stator member and a rotor member, said stator member including a frame structure and end brackets completely closing the ends of the frame structure, said frame structure having a plurality of axial passages therethrough spaced apart circumferentially of the frame structure, said frame structure also having a plurality of axially extending air chambers therein in the spaces between said axial passages, said air chambers communicating only with the interior of the frame structure, each of said end brackets having a closed, annular chamber therein communicating with said axial passages, inlet and discharge means in said annular chambers for circulating a liquid cooling medium through the chambers and axial passages, baffle means in at least one of said annular chambers for directing the flow of liquid to cause it to flow through successive groups of axial passages in series, and means for circulating air within the frame structure through said air chambers.

FRANCIS J. JOHNS.
THEODORE C. FOCKLER.